United States Patent [19]

Hardison

[11] 4,076,621

[45] Feb. 28, 1978

[54] CHELATE OXIDATION OF HYDROGEN SULFIDE IN SOUR WATER

[75] Inventor: Leslie C. Hardison, Barrington, Ill.

[73] Assignee: Air Resources, Inc., Palatine, Ill.

[21] Appl. No.: 667,111

[22] Filed: Mar. 15, 1976

[51] Int. Cl.² .............................................. C02B 1/18
[52] U.S. Cl. .................................. 210/60; 210/63 R; 55/73; 423/573 R
[58] Field of Search ................... 210/60, 58, 61, 63 R, 210/59; 55/73; 423/224, 571, 573 R, 573 G

[56] References Cited

U.S. PATENT DOCUMENTS

| | | | |
|---|---|---|---|
| 1,964,487 | 6/1934 | Smith | 210/61 |
| 2,897,150 | 7/1959 | Bencowitz | 210/63 R |
| 2,996,449 | 8/1961 | Hodge et al. | 210/58 |
| 3,068,065 | 12/1962 | Hartley | 23/2 |
| 3,097,925 | 7/1963 | Pitts | 23/225 |
| 3,226,320 | 12/1965 | Mewly | 210/63 R |
| 3,532,595 | 10/1970 | Arnesjo | 55/73 |
| 3,754,376 | 8/1973 | Kent | 55/73 |
| 3,761,409 | 9/1973 | McCoy et al. | 210/63 R |
| 3,767,777 | 10/1973 | Frye | 55/73 |
| 3,795,486 | 3/1974 | Ekman | 55/73 |
| 3,907,526 | 9/1975 | Saleem | 55/73 |
| 3,936,281 | 3/1974 | Kurmeier | 55/73 |

FOREIGN PATENT DOCUMENTS

999,799   7/1965   United Kingdom ............ 423/573 L

*Primary Examiner*—Charles N. Hart
*Assistant Examiner*—Ernest G. Therkorn
*Attorney, Agent, or Firm*—Merriam, Marshall & Bicknell

[57] ABSTRACT

Sour water is stripped with air in a tower to remove hydrogen sulfide, and the evolved gas is scrubbed with an aqueous chelated iron solution in an upper portion of the tower to absorb the hydrogen sulfide and oxidize it to sulfur. The treated gas is discharged from the top of the tower. In the lower portion of the tower the chelated iron solution mixes with the sour water and effects removal of residual hydrogen sulfide in solution in the water. The stripping air is introduced into the lower portion of the tower and also functions to reoxidize the chelated iron solution to maintain its activity. The treated water containing chelated iron and sulfur solids is withdrawn from the bottom of the tower and a major portion is preferably recycled and fed to the stripping zone along with the inlet sour water. After separation and recovery of the sulfur solids, if desired, the remainder of the stream is discharged to waste.

9 Claims, 1 Drawing Figure

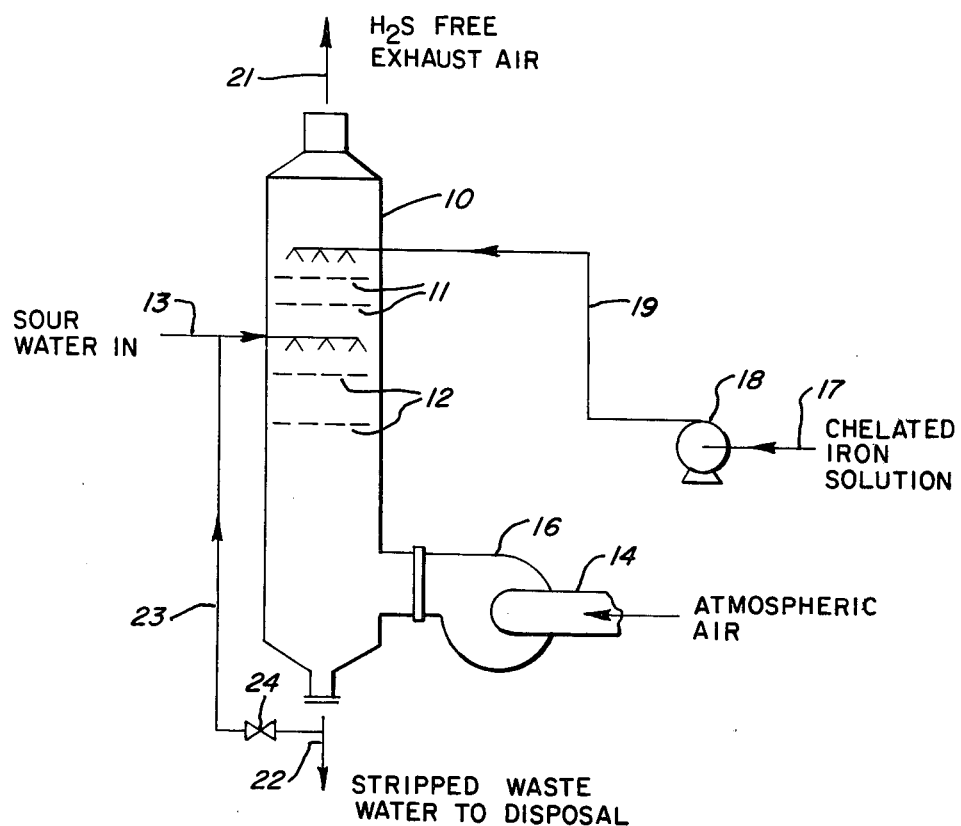

CHELATE OXIDATION OF HYDROGEN SULFIDE IN SOUR WATER

This invention relates to a novel and improved system for the treatment of so called "sour water" to effect removal of dissolved hydrogen sulfide.

Hydrogen sulfide is generated under anaerobic process conditions in many industrial processes. Typical examples are in the hydro-treating of gasoline and fuel oils where mercaptans, disulfides, thiophenes and other sulfur compounds are selectively hydrogenated to reduce the sulfur level. The resulting hydrogen sulfide gas is usually vented from the process with a hydrogen-rich bleed stream from the high pressure gas-liquid separator after the catalytic reactor, from a low pressure secondary separator, and from a stripping column. Each of these vent gases can ordinarily be compressed and the effluent discharged into the refinery fuel system for recovery of the fuel value and removal of the hydrogen sulfide by amine scrubbing. However, it is necessary to wash associated cooler and condenser surfaces periodically with water to prevent fouling due to accumulation of ammonium sulfide and other salts condensed from the gas stream. The wash water as a liquid phase may be applied intermittently or continuously to the reactor effluent to wash out salt deposits formed. The wash water dissolves hydrogen, ammonia, some hydrocarbons, and hydrogen sulfide, and the resultant aqueous phase is commonly called "sour water" because of its dissolved hydrogen sulfide content.

Although the foregoing is a typical example of how sour water may be formed in a refinery operation it will be understood that the present invention is useful in the treatment of any sour water stream regardless of its source.

When sour water streams are reduced to atmospheric pressure, the dissolved gases flash out of solution and may create odor nuisances as well as health hazards. In accordance with the usual practice, the vent gases from the water receivers are piped into a collection system and incinerated, and the water is taken to a sour water stripper where steam is used to drive off the hydrogen sulfide (and ammonia, if present) before the water is discharged to the sewer. However, the operation of the sour water stripper adds little to the overall performance of the refinery, and the evolved hydrogen sulfide gas must also be incinerated or otherwise treated. Of course, incineration of hydrogen sulfide results in formation of sulfur dioxide which is also a serious atmospheric pollutant. The quantities of hydrogen sulfide involved are frequently too small or the location of the sour water stripper too inconvenient to warrent use of other customary methods of hydrogen sulfide removal, e.g. by a Claus reactor.

Accordingly, a primary object of the present invention is to provide a novel and improved process and apparatus for the treatment of sour water which overcomes the disadvantages of the practices heretofore employed.

A further object of the invention is to provide a novel process and apparatus for effecting combined stripping of hydrogen sulfide gas from sour water and conversion of both the evolved hydrogen sulfide and also the residual dissolved hydrogen sulfide to sulfur.

Another object of the invention is to provide a novel process and apparatus of the foregoing character which utilizes an aqueous chelated iron solution as a catalyst or reagent to effect conversion of hydrogen sulfide to sulfur.

Other objects and advantages of the invention will be understood from the following description of the drawing which is a schematic process flow diagram illustrating one specific embodiment of the invention.

The treating vessel comprises an upright stripping and scrubbing tower 10 containing two contact zones comprising conventional liquid-vapor contacting means such as the plates or trays designated at 11 and 12, respectively. The inlet sour water stream is introduced through a line 13 into an intermediate portion of the tower 10 above the lower contact zone comprising the trays 12, and atmospheric air as the stripping medium is introduced into the bottom of the tower 10 through an inlet 14 and a blower 16. As the liquid phase passes downwardly in countercurrent contact with the upwardly flowing air, hydrogen sulfide gas is stripped from the water. The resultant hydrogen sulfide-containing gas passes upwardly through the upper contact zone comprising the trays 11 and is there scrubbed with an aqueous chelated iron solution which is introduced by a line 17, a pump 18, and a line 19 to a point in the tower 10 above the trays 11. In accordance with known mechanisms, hereinafter described, the chelated iron solution absorbs the hydrogen sulfide from the upwardly flowing gas stream and oxidizes it to elemental sulfur. The air stream with all, or substantially all, of the hydrogen sulfide removed, is discharged to the atmosphere through a line 21 from the top of the tower 10.

As the chelated iron solution descends into the lower contact zone it is intimately mixed with the sour water introduced through line 13, thereby removing from the sour water any residual dissolved hydrogen sulfide which has not been stripped from the sour water. Thus, it will be seen that the chelated iron solution removes the hydrogen sulfide content of both the evolved gas and the liquid sour water simultaneously. Ultimately, the liquid phase comprising the stripped water and the chelated iron solution is discharged to waste from the bottom of the tower 10 through a line 22. This stream also contains sulfur solids which can be removed and recovered by conventional filtration, settling or other known separation techniques (not shown) before the stream is discharged to waste. Preferably, a major portion of the exit water stream withdrawn through line 22 is recycled to the tower 10 through a line 23 containing a valve 24 and is combined with the inlet sour water stream introduced through the inlet line 13.

Since the chelated iron solution requires reoxidation to restore its effectiveness after being contacted with hydrogen sulfide, the air introduced into the bottom of the tower 10 serves not only to strip hydrogen sulfide gas from the incoming sour water but also to maintain the activity of the chelated iron solution by oxidizing the same throughout the tower 10, including the upper and lower contact zones 11 and 12. If desired, a mixture of air and steam may be introduced at the bottom of the tower 10 to improve the stripping of hydrogen sulfide from the sour water.

In the removal of hydrogen sulfide from gases using a chelated iron solution, the contacting of the hydrogen sulfide-containing gas stream with the chelated iron solution (in which the iron is in the ferric state) effects oxidation of the hydrogen sulfide to elemental sulfur with concomitant reduction of the iron from the ferric state to the ferrous state. The solution is regenerated by aeration or the like to oxidize the iron to the ferric state.

Such processes are described generally in various prior art patents, e.g. U.S. Pat. Nos. 3,068,065; 3,097,925; 3,226,320; 3,622,273; and 3,676,356; and also British patent Nos. 999,799; 999,800; and 855,421.

The chemistry of the oxidation-reduction system is represented by the following equations:

$$H_2S\ (g) \rightleftharpoons H_2S\ (aq.) \tag{1}$$

$$H_2S\ (aq.) + OH^- \rightleftharpoons HS^- + H_2O \tag{2}$$

$$HS^- + OH^- \rightleftharpoons S^{-2} + H_2O \tag{3}$$

$$2Fe^{+3} + S^{-2} \rightarrow 2Fe^{+2} + S° \tag{4}$$

$$2Fe^{+2} + \tfrac{1}{2}O_2 + H_2O \rightleftharpoons 2Fe^{+3} + 2\ OH^- \tag{5}$$

However, since the iron in the system is present in two different valence states there are also competing side reactions which can occur, resulting in loss of iron and rendering the solution ineffective for removal of hydrogen sulfide:

$$Fe^{+2} + S^{-2} \rightarrow FeS\downarrow \tag{A}$$

$$Fe^{+3} + 3(OH)^- \rightarrow Fe(OH)_3\downarrow \tag{B}$$

Although the process can be operated over a wide range of pH, it is preferred to maintain the pH of the solution at from about 7 to about 13, with the optimum range being from about 8 to about 10.5.

The inherent instability of a chelated iron solution, as noted above, may be overcome by using two different types of chelating agents, one of which (Type A) is selected by bind ferrous ions strongly enough to prevent precipitation of ferrous sulfide and the other of which (Type B) is selected to bind ferric ions strongly enough to prevent precipitation of ferric hydroxide. This reagent or catalyst and the process of using it are more fully described in Application Ser. No. 551,279, filed Feb. 20, 1975 by Ralph B. Thompson and assigned to the same assignee as the present application, which application is incorporated herein by reference. Although the present invention contemplates the use of any chelated iron solution which is operable for removing hydrogen sulfide, it is particularly advantageous to use the aforementioned solution containing two different types of chelating agents selected for their ability to complex ferrous and ferric ions, respectively.

When the mixed chelating agents are used, the first or Type A chelating agent for complexing ferrous ions preferably comprises (either singly or as a mixture) the polyamino polycarboxylic acids, the polyamino hydroxyethyl polycarboxylic acids, or the polyphosphonomethylamines, the latter being phosphorus analogs of the polyamino polycarboxylic acids. Usually the aforementioned types of chelating agents will be used in the form of their alkali metal salts, particularly the sodium salts. The polyamino polyacetic acids and the polyamino hydroxyethyl polyacetic acids, or their sodium salts, are particularly desirable. The second or Type B chelating agent for complexing ferric ions preferably comprises the sugars, the reduced sugars, or the sugar acids. Examples of suitable sugars are the disaccharides, such as sucrose, lactose, and maltose, and the monosaccharides, such as glucose and fructose. Examples of suitable sugar acids are gluconic acid and glucoheptanoic acid, and these will usually be used in the form of their alkali metal salts, particularly the sodium salts. The reduced sugars, however, are preferred for the Type B chelating agent since there is no possibility of hydrolysis or oxidation at a potential aldehyde group. Examples of suitable reduced sugars are sorbitol and mannitol.

A preferred formulation comprises a mixture of the sodium salts of ethylene diamine tetra-acetic acid and N-hydroxyethyl ethylene diamine triacetic acid as the Type A chelating agent and sorbitol as the Type B chelating agent. Aqueous solutions of the aforementioned Type A chelating agents are available commercially from the Dow Chemical Co. under the trademark "Versene 100" ($Na_4EDTA$) and "Versenol 120" ($Na_3$-HEDTA). The use of this mixture of Type A chelating agents is particularly advantageous since it insures the desired iron complexing effect not only in the optimum pH range of from about 8 to about 10.5 but also at pH levels above and below this range.

The chelated iron solution is preferably prepared by dissolving a suitable iron salt in water and adding the required amounts of the chelating agent or agents. To this solution an alkaline material, such as sodium carbonate or sodium hydroxide, may be added to provide a concentrate which can be diluted with water as required to obtain an operation solution having the desired pH and iron content. The iron content of the operating solution may vary over a wide range, dependent upon the hydrogen sulfide content of the sour water being treated and other factors. In general, the iron content of the chelated iron solution as introduced into the tower 10 may range from about 5 ppm to about 5000 ppm by weight, but for the preferred type of solution using the Type A and Type B chelating agents, as discussed above, the iron content is preferably from about 200 to about 5000 ppm by weight. In preparing the concentrate it is desirable to add the chelating agent or agents before the alkaline agent so as to avoid precipitation of iron. However, the presence of two types of chelating agents improves the stability of the solution so that no great care is required in making up the solution to prevent precipitation of iron hydroxide.

For economy, the amount of the chelating agent need be no greater than required to complex the amount of iron present, and in general lesser amounts can be used. When Type A and Type B chelating agents are used together, it is desirable, for ease of regeneration, that the molar ratio of Type A chelating agent to iron be not greater than 2:1 and preferably from about 1:1 to about 1.5:1. The iron salt is preferably a ferric salt such as ferric chloride, ferric sulfate, or ferric nitrate. However, it is also possible to use a ferrous salt such as ferrous sulfate, but in this case the solution must be aerated prior to use in order to insure oxidation of the chelated iron to the ferric state. The alkaline material is preferably sodium carbonate or sodium hydroxide or mixtures thereof, although other compatible alkaline compounds may be used.

Since the stripped water stream removed from the bottom of the tower 10 at line 22 is discharged to waste, the total amount of chelated iron in this solution shoulld be low enough to be economically feasible and to meet the standards of the locality as regards industrial waste. Ordinarily, this will not present a serious problem since the hydrogen sulfide content of sour water is relatively low, and the amount of chelated iron required to effect substantially complete removal of the hydrogen sulfide will likewise be relatively small. For example, the hydrogen sulfide content of sour water may ordinarily be expected to be from about 50 to about 500 ppm by weight, with 100 ppm being typical. Theoretically, a weight ratio of iron to hydrogen sulfide of approximately 3:1 is required to effect complete oxidation of hydrogen sulfide to sulfur. If the tower 10 is designed and operated properly to achieve effective aeration and oxidation of the chelated iron solution, it is feasible to operate below the theoretical ratio of 3:1, thereby keeping the chelated iron requirements of the process to a minimum. In any event, for economical operation the iron content of the aqueous stream discharged to waste through line 22 should not be greater than about 1000 ppm and preferably much less, e.g. as low as about 2 ppm.

By way of example, a chelated iron solution suitable for use in the present invention may be prepared from a concentrate having the following composition:

|  | Grams |
|---|---|
| Water | 2400 |
| FeCl$_3$ (39 wt. % aqueous solution) | 577 |
| Na$_4$EDTA | 272 |
| Na$_3$HEDTA (41 wt. % aqueous solution) | 272 |
| Sorbitol (70 wt. % aqueous solution) | 272 |
| NaOH (50 wt. % aqueous solution) | 153 |
| Na$_2$CO$_3$ | 350 |

This concentrate is diluted with sufficient water to provide an operating solution having the desired iron content.

I claim:

1. A process for treating sour water to remove hydrogen sulfide therefrom, which comprises:

introducing sour water into an intermediate portion of a treating tower between upper and lower contact zones thereof, and passing the sour water downwardly through said lower contact zone;

introducing air into the lower portion of said tower and passing the air upwardly through said lower contact zone countercurrently to said sour water, thereby stripping hydrogen sulfide gas from said sour water;

introducing an aqueous chelated iron solution into said tower above said upper contact zone, and passing said solution downwardly through said upper contact zone;

passing the evolved gas containing hydrogen sulfide and air from said lower contact zone upwardly through said upper contact zone countercurrently to said solution, whereby said solution removes hydrogen sulfide from the gas and oxidizes it to sulfur;

discharging the treated gas from the upper portion of said tower;

passing said solution downwardly from said upper contact zone through said lower contact zone wherein said solution mixes with the sour water introduced thereto and whereby said solution oxidizes residual dissolved hydrogen sulfide in said sour water to sulfur;

said air passing upwardly through said lower contact zone and through said upper contact zone functioning to oxidize said chelated iron solution and maintain its activity; and withdrawing from the lower portion of said tower an aqueous stream comprising the treated sour water, said chelated iron solution, and sulfur solids.

2. The process of claim 1 further characterized in that a major portion of said aqueous stream withdrawn from the lower portion of said tower is recycled and introduced into said intermediate portion of said tower along with said sour water.

3. The process of claim 2 further characterized in that the remainder of said aqueous stream is discharged to waste after separation of said sulfur solids.

4. The process of claim 1 further characterized in that steam is also introduced into the lower portion of said tower along with said air.

5. The process of claim 1 further characterized in that the iron content of said aqueous chelated iron solution introduced into said tower is from about 5 to about 5000 ppm by weight, and the iron content of said aqueous stream withdrawn from the lower portion of said tower is from about 2 to about 1000 ppm.

6. The process of claim 1 further characterized in that said solution contains (A) at least one chelating agent capable of binding iron in the ferrous state to prevent formation of ferrous sulfide and (B) at least one additional chelating agent capable of binding iron in the ferric state to prevent formation of ferric hydroxide.

7. The process of claim 6 further characterized in that said first-named chelating agent (A) is selected from the group consisting of the polyamino polycarboxylic acids and their alkali metal salts, the polyamino hydroxyethyl polycarboxylic acids and their alkali metal salts, the polyphosphonomethyl amines and their alkali metal salts, and mixtures of the foregoing, and said second-named chelating agent (B) is selected from the group consisting of sugars, reduced sugars, and sugar acids and their alkali metal salts.

8. The process of claim 6 further characterized in that said first-named chelating agent (A) is selected from the group consisting of the polyamino polyacetic acids and their alkali metal salts, the polyamino hydroxyethyl polyacetic acids and their alkali metal salts and mixtures of the foregoing, and said second-named chelating agent (B) is a reduced sugar selected from the group consisting of sorbitol and mannitol.

9. The process of claim 6 further characterized in that said first-named chelating agent comprises a mixture of the sodium salts of ethylene diamine tetra-acetic acid and N-hydroxyethyl ethylene diamine triacetic acid, and said second-named chelating agent comprises sorbitol.

* * * * *